United States Patent [19]
Morris et al.

[11] Patent Number: 5,139,538
[45] Date of Patent: Aug. 18, 1992

[54] PHOSPHATE CERAMIC BACKING BLOCKS AND THEIR PREPARATION

[75] Inventors: Debra L. Morris, Oxford; L. Gene Hartzell, Lancaster, both of Pa.

[73] Assignee: Armstrong World Industries, Inc., Lancaster, Pa.

[21] Appl. No.: 796,332

[22] Filed: Nov. 22, 1991

Related U.S. Application Data

[62] Division of Ser. No. 632,729, Dec. 24, 1990, Pat. No. 5,101,600.

[51] Int. Cl.[5] ............................................. C09K 3/14
[52] U.S. Cl. ...................................... 51/298; 501/84; 427/419.2
[58] Field of Search .................... 51/141, 298; 501/95, 501/84, 85; 427/419.2; 264/311, 299

[56] References Cited

U.S. PATENT DOCUMENTS

| | | | |
|---|---|---|---|
| 4,375,516 | 3/1983 | Barrall | 501/84 |
| 4,588,420 | 5/1986 | Charvat | 51/298 |
| 4,662,121 | 5/1987 | Ginter | 51/141 |

Primary Examiner—Bruce M. Kisliuk
Assistant Examiner—E. Morgan

[57] ABSTRACT

Phosphate ceramic backing blocks are provided for the profile sanding of wood. The blocks are made of rigid, non-foamed phosphate ceramic. The ceramic is dimensionally stable in spite of friction-caused heat, and also has a semi-polished finish that is achieved without polishing. The phosphate ceramic block is simply made by molding the wet reaction mixture for the ceramic, and then curing the ceramic mixture.

5 Claims, 1 Drawing Sheet

PHOSPHATE CERAMIC BACKING BLOCKS AND THEIR PREPARATION

CROSS-REFERENCE TO RELATED APPLICATION

This is a division of application Ser. No. 632,729, filed Dec. 24, 1990 now U.S. Pat. No. 5,101,600.

BACKGROUND OF THE INVENTION

Field of the Invention

This invention relates to sanding blocks used in the profile of sanding wood. These blocks are shaped and profiled backing blocks. Typically, they provide support for an abrasive-sided sheet or belt as it sands the wood.

Well known commercial uses of these blocks are in traveling-belt sanding machines. The belts in these machines are abrasive coated. A work piece is pressed up against the backing block while the moving belt smooths its surface.

Traditional preparation of blocks has included machining, cutting, or otherwise forming, in the block, a reverse profile of the wood to be sanded. Since a different block was required for each distinct shape of wood, the cumbersome, conventional block preparation methods discouraged variety due to the difficulties encountered in replacing the block.

The reverse profile of the wood profile to be sanded is found on one face of the block, known as a pressure face. This face presses against the back of the abrasive sheet or belt as it sands and smooths the working piece to provide moldings, furniture, and the like.

It is known for belts to move at 2500–5000 ft./min. Thus, when the backing block and belt press together a considerable amount of heat is caused by the friction. Friction and heat cause problems including block deterioration, uneven wear, shortening of belt life and contour changes due to block expansion are encountered.

Blocks found described in the art include those of U.S. Pat. No.4,662,121 which describes blocks with air holes for cooling. These blocks are made of mullite, and are formed from aluminum silicate which must be heated to 1550°–1625° C. The belt-contacting face of these blocks are machined (or formed mechanically) and highly polished.

U.S. Pat. No.2,717,422 also describes backing blocks used in wood sanding operations. These blocks have a pressure face liner of a dimensionally stable plastic.

The instant invention provides several advantages over prior art sanding blocks. The phosphate ceramic backing blocks are much easier, faster, and cheaper to make. The simple preparation method of the ceramic block allows blocks to be replaced much more easily.

Since the blocks provided in accordance with the instant invention are made with phosphate ceramic, they have dimensional stability even though a great deal of heat builds up during the sanding operation. Even with this heat build-up, furthermore, these phosphate ceramic blocks also provide good belt life. In addition to this, since the present ceramic backing blocks are dimentionally stable in spite of the heat, it is not mandatory to provide means for cooling the blocks.

SUMMARY OF THE INVENTION

The present invention provides a particular kind of backing for wood sanding operations. This backing comprises a non-foamed, rigid, phosphate ceramic backing block which has a pressure face that is contoured so that it is the reverse profile of the working piece of wood to be sanded. The backing block is held against the back of an abrasive-surfaced sheet or belt as the abrasive side sands the wood profile which the block is contoured to fit.

The phosphate ceramic backing blocks are cast in molds which have an interior surface that is shaped and contoured to match the contour of the wood working piece. The ceramic backing block can be made by filling the mold with a wet mixture of calcium silicate, an aqueous phosphoric acid solution, and a metal oxide selected from the group consisting of aluminum oxide, magnesium oxide, calcium oxide, and zinc oxide. The wet mixture is then permitted to cure, thus forming the phosphate ceramic backing block having a pressure face with a reverse profile of the wood which is to be sanded. The solid ceramic block is then ready for use in the sanding operation.

DESCRIPTION OF THE DRAWING

FIG. 1 shows a view of the contoured, pressure (belt-contacting) face (1) of the block. The pressure face of such blocks can, of course, be molded in any contour or shape to provide whatever configuration is needed for the work piece that is to be sanded.

FIGS. 1, 2, and 3 all show a contour that is a groove (2) running across face (1) of the block. The figures also show threaded shafts (3) that are used in the block as a means for securing the block or attaching it to a specific location or machinery.

DETAILED DESCRIPTION

Figure 1:
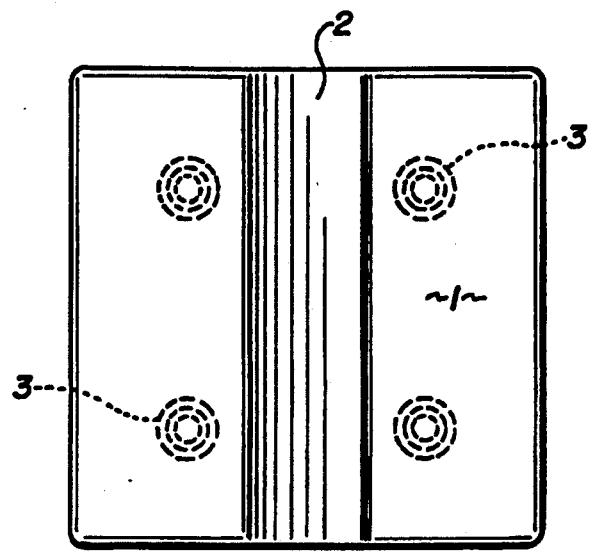
FIGS. 1, 2, and 3 show a rectangularly shaped backing block.

The present phosphate ceramic backing blocks can be used in any type of wood sanding and adapted to any wood sanding equipment to provide the backing support needed.

In the wood sanding operation, the block will be pressing against the smooth side of an essentially two-sided flexible sheet or belt. As this occurs, the surface of the working piece being sanded presses against the other (abrasive) side of the flexible sheet. Movement between the wood and the abrasive surface causes the wood to be sanded. The contour of the pressure face of the backing block is the reverse profile of the wood. The flexible sheet will conform to the contoured pressure-face. The wood piece fits into the contours of the pressure-face. The surface of the wood working piece, placed against the abrasive surface, will be smoothed by the abrasive side.

Any conventional means can be used to press the backing block against the back of the sanding belt to force it into engagement with the work piece. The backing block may even be in a fixed position. In some embodiments, the block can be located so that the work pieces are moved and brought into engagement with the sanding surface as it is supported by the block.

The present phosphate ceramic backing block can be used in any conventional wood sander. The wood sander could, for example, be a traveling belt sanding machine such as the profile sanders described in U.S. Pat. No.4,662,121. In fact, the present backing support for wood sanding is called a "block", but it should be appreciated that this support could be used in any convenient shape, for example, in the form of an oblong rectangle or even a board.

Advantageously, the phosphate ceramic is dimensionally stable in spite of the heat that is usually generated during the sanding operation. Although the temperatures can reach 200° F., or even higher, the superior dimensional stability of the ceramic block will insure the continued uniform sanding of the working pieces.

With the present invention, therefore, there is no need to drill or mold cooling or ventilating holes in the blocks, although this could be done if desired. Such ventilating holes could, however, be used if desired, for example, as an aid to increasing belt life. If used, the ventilation holes are placed away from the pressure face, keeping that face smooth and strong.

If it is needed for the particular sanding operation in which the ceramic backing block is to be used, the ceramic block can be fitted with means for fixing the block either to a sanding machine or to a stationary location. These means for attaching the block can include molded holes where clamps can take hold of the block, threaded sockets for screws, bolts, etc. The blocks could be clamped into place for use in profile sanding, or it could be fitted with a means for attaching it to the sander. It is also possible to put into the wet mix the desired fittngs and/or other means for attaching the block. In such a case after the block has cured the means for attaching will already be in place.

The preparation of the rigid, non-foamed phosphate ceramic material is a known technology, and can be found in references such as U.S. Pat. No. 4,375,516. Phosphate ceramics such as these can be used to prepare the backing blocks for wood sanding. Accordingly, the phosphate ceramic can be prepared with wollastonite (calcium silicate), phosphoric acid, and a metal oxide selected from the group consisting of: aluminum oxide, magnesium oxide, zinc oxide, and calcium oxide. Most preferably, the ceramic block is made with the metal oxides aluminum oxide and magnesium oxide.

For these compositions, it is preferred that the mole ratio of the metal of the metal oxide relative to the phosphorous be in the range of from about 1:1 to about 1:4. Preferably the calcium:phosphorous mole ratio is in the range of from about 1:1 to about 1:4.

In some preferred embodiments, based on 100 parts of wollastonite, a phosphoric acid solution can be used in an amount of from about 80 to about 190 parts by weight, the solution having the equivalent of from about 35 to about 75% by weight of phosphorous pentoxide; and the metal oxide can be used in an amount of from about 11 to about 65 parts by weight.

If desired, the phosphate ceramic can contain additional materials to provide advantages for the sanding operation. Fillers, hardeners, or solid lubricant materials can, for example, be added to the wet reaction mixture before it is cast into the mold. Fiber can be added. The fibers can be made from synthetic or natural materials. Suitable fibers include cellulose, carbon, metal, polymeric, etc.

Suitable fillers can be selected from the group consisting of: sand, mica, vermiculite, polymer, fly ash, glass, and quartz. In some embodiments, it might be preferred to place such additives in the wet reacting mixture so that they are located at or near the contoured pressure face.

In preferred processing embodiments, a portion of the metal oxide is mixed with the phosphoric acid solution to form a mixture (a phosphoric solution mixture) before adding a dry mixture of the wollastonite and the rest of the metal oxide to the phosphoric solution mixture. It is also preferred that the phosphoric solution mixture is clear (not cloudy) when adding the wollastonite and metal oxide dry mix. Most preferably least a portion of aluminum oxide is added first.

In other preferred processing embodiments, the phosphoric acid solution and/or the phosphoric acid-metal oxide reaction mixture is maintained at a temperature less than about 38° C. before the wollastonite is added. Preferably, the phosphoric solution mixture is at a temperature in the range of from about 4° to about 24° C. when the wollastonite is added.

After all of the ingredients are mixed, there is an ample length of time available for mold-filling; before the wet reaction mixture gets hard (sets), the wet reaction mixture is poured into a mold. The interior of the mold, of course, will have a surface that is contoured so that it is the shape of the wood surface which is expected to be sanded. After filling the mold, the mixture is permitted to "cure" until the hardened ceramic block is produced.

In preferred processes, the mold is agitated, tapped, or shaken as the reaction mixture is put into it. This helps to fill the mold completly.

In preferred embodiments, fiber is added and the wet, curing reaction mixture is put under pressure in order to increase the strength of the backing block produced. If desired, most of the fiber can be located away from the belt-contacting surface, or filler can be added to or folded into the wet reacting mixture that is to become the belt-contacting face.

After hardening, the finished phosphate ceramic backing block can be demolded. The ceramic's surface is smooth and, in its natural state, even appears to be semi-polished.

The following example is offered to illustrate the present invention and should not be taken to limit it. All parts and percentages are by weight unless otherwise indicated.

EXAMPLE

A phosphate ceramic contoured backing block was made which was suitable for use in a profile sander.

The rigid, non-foamed phosphate ceramic that was used to prepare the profile sander backing block had the following formulation:

| Ingredient | Parts (by Wt.) |
| --- | --- |
| $Al_2O_3 \cdot 3H_2O$ | 7.2 |
| MgO | 4.0 |
| $CaSiO_3$ | 58.0 |
| 75% $H_3PO_4$ (53% $P_2O_5$) | 54.2 |
| $H_2O$ | 8.6 |
| Sand | 32.0 |

A wet mixture was prepared by mixing the phosphoric acid, the aluminum oxide and the water until a clear solution was obtained. The solution was then cooled to 4° C. and then a dry mixture of the MgO and the wollastonite (calcium silicate) was added with vigorous mixing using an air stirrer.

Figure 2:
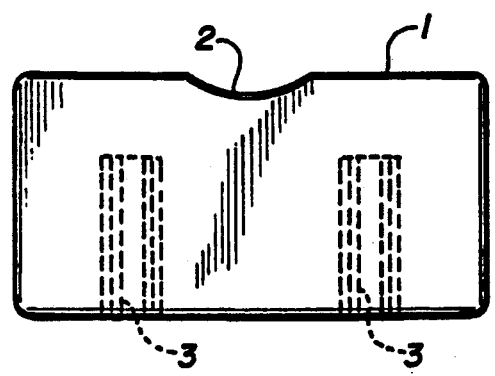
Figure 3:
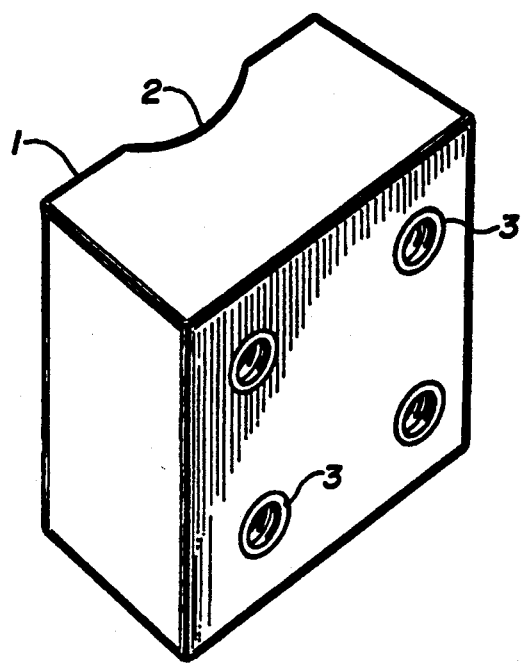

The wet mixture which was ready at this point was in the state of reacting to form the desired non-foamed, rigid phosphate ceramic. Before the mixture had a chance to set, it was poured into a mold that had the necessary contour and configuration to produce a backing block shaped like the block shown in FIGS. 1, 2, and 3.

As the wet mixture was poured into the mold, the mix and the mold were vibrated to help fill the mold completely with the wet mix and to help give the ceramic a smooth surface.

After the mold had been filled completely, the mold was capped and the wet mix was put under moderate pressure amd allowed to cure. It took approximately five minutes for the wet mixture to become a rigid phosphate ceramic block. The block was then demolded. The surface of the block even had a slight sheen as if it had been polished.

In this example, the block was drilled with holes and threaded sockets were inserted so that the block could be held in place with screws.

What is claimed is:

1. A process for a wood-sanding backing block comprising: a) filling a mold with a wet mixture of calcium silicate, an aqueous phosphoric acid solution, and a metal oxide selected from the group consisting of aluminum oxide, magnesium oxide, calcium oxide, and zinc oxide, wherein further, in the mold there is a side which accurately conforms to a profile of a piece of wood which is to be sanded; and b) curing the wet mixture to form a rigid, non-foamed phosphate ceramic backing block having a pressure face with a reverse profile of the wood which is to be sanded.

2. The process of claim 1 wherein the metal oxide is aluminum oxide and magnesium oxide.

3. The process of claim 1 wherein the wet mixture was prepared by combining the phosphoric acid solution with aluminum oxide and then adding a dry mixture of magnesium oxide and the calcium silicate.

4. The process of claim 1 wherein the wet mixture contained either: a) 100 parts by weight of the calcium silicate, from about 11 to about 65 parts by weight of the metal oxide, and from about 80 to 190 parts by weight of the phosporic acid solution, the said solution having phosphorous pentoxide in an amount of from about 35 to about 75% by weight of the solution; or b) the metal oxide at an amount which sets a mole ratio of metal:phosphorous in the range of from about 1:1 to about 1:4, and calcium at an amount that sets a calcium:phosphorous mole ratio in the range of from about 1:1 to about 1:4.

5. The process of claim 1 wherein the wet mixture also contained a filler selected from the group consisting of sand, mica, vermiculite, polymer, fly ash, glass, and quartz.

* * * * *